United States Patent
Lau

(10) Patent No.: US 11,201,540 B2
(45) Date of Patent: Dec. 14, 2021

(54) MOTOR CONTROL CIRCUIT WITH POWER FACTOR CORRECTION

(71) Applicant: fReal! Foods, LLC, Emeryville, CA (US)

(72) Inventor: Shek Fai Lau, Foster City, CA (US)

(73) Assignee: f'Real! Foods, LLC, Emeryville, CA (US)

( * ) Notice: Subject to any disclaimer, the term of this patent is extended or adjusted under 35 U.S.C. 154(b) by 115 days.

(21) Appl. No.: 16/782,985

(22) Filed: Feb. 5, 2020

(65) Prior Publication Data

US 2020/0259413 A1 Aug. 13, 2020

Related U.S. Application Data

(60) Provisional application No. 62/802,667, filed on Feb. 7, 2019.

(51) Int. Cl.
*H02M 1/42* (2007.01)
*H02P 25/092* (2016.01)
*H02M 7/217* (2006.01)

(52) U.S. Cl.
CPC ....... *H02M 1/4225* (2013.01); *H02M 7/2176* (2013.01); *H02P 25/092* (2016.02); *H02P 2201/15* (2013.01)

(58) Field of Classification Search
CPC . H02M 1/4225; H02M 7/2176; H02P 25/092; H02P 2201/15
See application file for complete search history.

(56) References Cited

U.S. PATENT DOCUMENTS

| | | | |
|---|---|---|---|
| 5,561,356 | A | 10/1996 | Nanos |
| 5,743,261 | A | 4/1998 | Maniero et al. |
| 6,191,565 | B1 | 2/2001 | Lee et al. |
| 8,264,182 | B2 | 9/2012 | Ramu |
| 8,766,581 | B2 | 7/2014 | Park et al. |
| 9,148,062 | B2 | 9/2015 | Heo |
| 9,172,323 | B2 | 11/2015 | Kim |

(Continued)

OTHER PUBLICATIONS

International Preliminary Report on Patentability for related Application No. PCT/US2020/01707 dated Aug. 10, 2021 (9 Pages).

*Primary Examiner* — Zoheb S Imtiaz
(74) *Attorney, Agent, or Firm* — Michael Best & Friedrich LLP

(57) ABSTRACT

A motor control circuit with power factor correction capabilities that optimizes the voltage and current load applied to an electric motor for different motor speeds and torque levels. The preferred motor control circuit includes a power factor correction circuit and a step down conversion circuit through which current passes before it reaches the motor. A microprocessor preferably monitors the current supplied to the motor and the motor's speed. If the microprocessor determines that the current supplied to the motor is too high, it can reduce the level of current by either using a pulse width modulation (PWM) digital-to-analog control circuit to instruct the power factor correction circuit to reduce current or it can use a PWM digital control circuit to instruct the step down conversion circuit to reduce current. An output voltage limiter circuit can be used to detect the voltage of current supplied to the motor and turn off current to the motor if the voltage is above a predetermined level.

28 Claims, 2 Drawing Sheets

(56) References Cited

U.S. PATENT DOCUMENTS

| | | |
|---|---|---|
| 9,331,598 B2 | 5/2016 | Jeong et al. |
| 2007/0273322 A1 | 11/2007 | Ramu |
| 2009/0021078 A1 | 1/2009 | Shah |
| 2011/0132899 A1* | 6/2011 | Shimomugi ........ H02M 3/1584 |
| | | 219/620 |
| 2015/0333515 A1* | 11/2015 | Tseng ........................ H02J 4/00 |
| | | 318/438 |
| 2016/0020716 A1* | 1/2016 | Skinner ................... H02M 1/32 |
| | | 318/434 |
| 2018/0056428 A1 | 3/2018 | Lindander et al. |
| 2018/0083529 A1 | 3/2018 | Pant et al. |

* cited by examiner

MOTOR CONTROL CIRCUIT WITH POWER FACTOR CORRECTION

CROSS-REFERENCE TO RELATED APPLICATIONS

This application claims the benefit of priority under 35 U.S.C. § 119(e) to U.S. Provisional Application No. 62/802,667, filed on Feb. 7, 2019, and entitled "Simplified Motor Control Circuit With Power Factor Correction," the disclosure of which is hereby incorporated by reference in its entirety.

FIELD OF THE INVENTION

The present invention relates to a motor control circuit that performs power factor correction and helps optimize the electrical output load to the motor, particularly for low speed, low torque motor operation.

BACKGROUND OF THE INVENTION

Recently, governments around the world have encouraged efficient energy use for electronic products and home appliances. In response to this initiative, power factor correction (PFC) circuits have been developed for such electronic products and home appliances. A PFC circuit is a circuit for switching input power and adjusting a phase difference (power factor) between a current and a voltage of the input power to efficiently transfer power to a load.

PFC circuits have been the subject of numerous prior art patents, including Nanos's U.S. Pat. No. 5,561,356; Ramu's U.S. Pat. No. 8,264,182; Park's U.S. Pat. No. 8,766,581; Heo's U.S. Pat. No. 9,148,062; Kim's U.S. Pat. No. 9,172,323 and Jeong's U.S. Pat. No. 9,331,598.

Integrated circuit chips have been created to allow circuit designers to include PFC functionality in their circuits. One such PFC chip is the "FL7701" Smart LED Lamp Driver IC with PFC Function chip manufactured and sold by On Semiconductor (Linear Technologies). While the FL7701 chip is useful for adding PFC functionality to an electrical circuit, it was designed for continuous resistive load LED lamp applications. Nonetheless, there are many other applications besides LED lamps where PFC functionality is needed, especially for inductive loads such as motors used in electronic products and home appliances.

Electric motors present circuit designers with different requirements and challenges than LED lamps, namely the capacitive and inductive nature of the motor load. For example, electric motors can be operated at different speeds and torque levels. While the FL7701 chip is particularly useful for LED lamps, it is not optimized for operation with the full range of speeds and torques utilized by electric motors. The FL7701 chip is particularly problematical when a motor is operated at low speed and low torque. For low speed, low torque operation, the voltage and current supplied to the motor by the FL7701 chip can be too high. What is needed is an improved PFC circuit that safely enables and optimizes the full range of motor capabilities, particularly for low speed, low torque operation.

BRIEF SUMMARY OF THE INVENTION

The present invention is directed to a motor control circuit with PFC capabilities that optimizes the voltage and current load applied to the electric motor for different motor speeds and torque levels. In the preferred embodiment, the motor control circuit includes a chip providing PFC and current control functionality. The output of the PFC chip is connected to a step down conversion circuit to drive the motor.

To optimize motor performance, additional circuitry is preferably connected to the electric motor, PFC chip and step down conversion circuit. For example, the current load and speed of the motor is preferably monitored by a firmware microprocessor. When appropriate, the microprocessor provides a buffered motor drive signal to a pulse width modulation (PWM) digital-to-analog circuit connected to the PFC chip. This PWM digital-to-analog circuit adjusts the output current of the PFC chip to optimize the current level supplied to the motor. Through use of an optocoupler, the PWM digital-to-analog circuit also preferably isolates the firmware microprocessor from high voltages in the motor drive circuit.

Additionally, current supplied to the motor can be optimized by a PWM digital control circuit which receives a buffered motor drive control signal from the microprocessor. Where the current supplied to the motor is too high, this PWM digital control circuit can intercept and override the output signal from the PFC chip at the step down conversion circuit. The PWM digital control circuit is particularly useful when the output load from the PFC chip is set at its minimum level but the power supplied to the motor is still too high. By adjusting the duty cycle, this PWM digital control circuit can make the output power very low or turn it off completely.

Finally, the output voltage across the motor is monitored by an output voltage limiter circuit which is capable of limiting the speed of the motor. This output voltage limiter circuit preferably includes a Zener diode and an optocoupler. When the output voltage limiter circuit determines that the output voltage is too high, such as higher than 120V, the Zener diode and optocoupler in the voltage limiter circuit directs the PFC chip to pull down the output current. This current restriction, which results in a voltage and corresponding speed reduction to the motor, is accomplished by circuit hardware which is independent of the microprocessor.

DETAILED DESCRIPTION OF THE INVENTION

Figure 1:
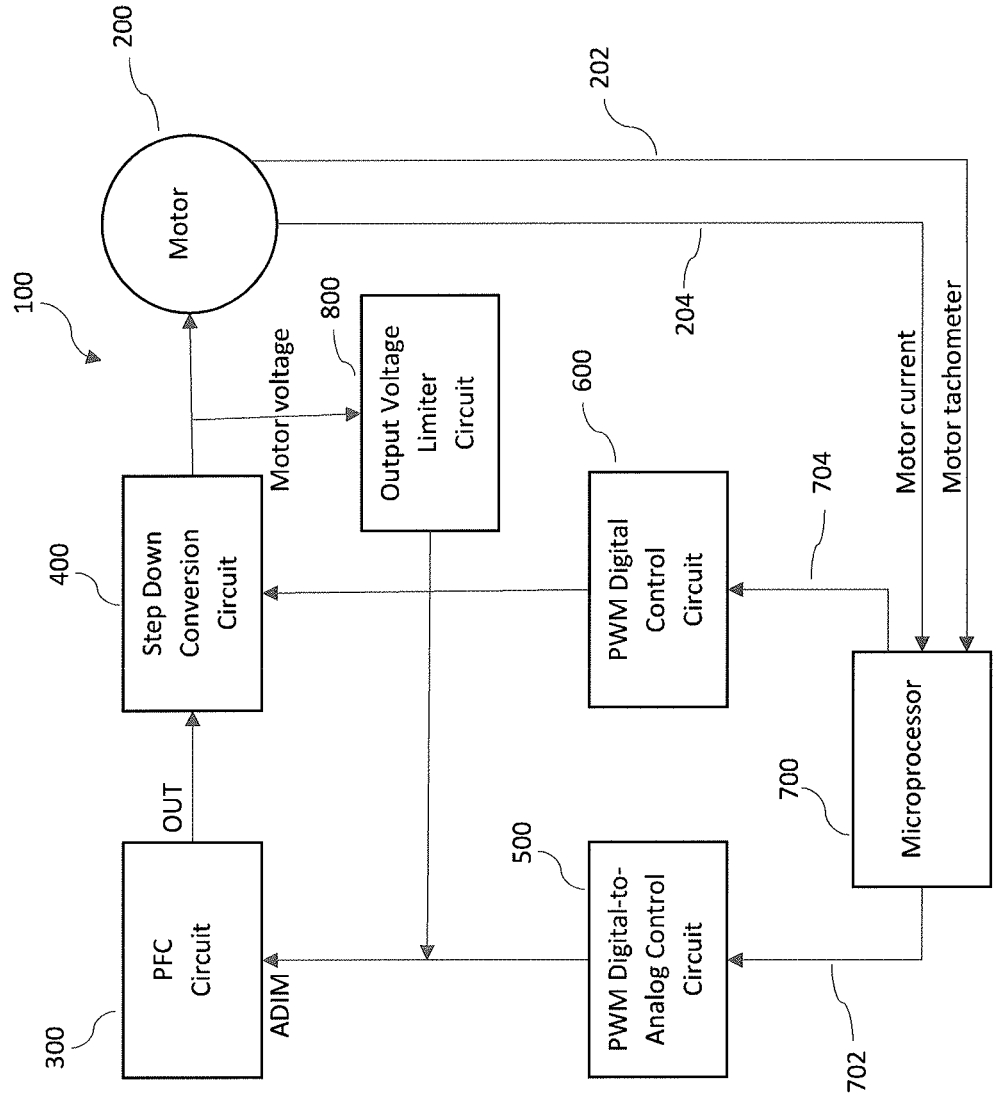
FIG. 1 is a simplified functional block diagram of a preferred embodiment of the present invention.

Referring now to FIG. 1, a preferred form of motor control circuit 100 of the present invention is shown in functional block diagram form. The motor control circuit 100 preferably includes a motor 200, a PFC circuit 300, a step down conversion circuit 400, a PWM digital-to-analog circuit 500, a PWM digital control circuit 600, a firmware microprocessor 700 and an output voltage limiter circuit 800. The motor 200 is an electric motor, preferably a Permanent Magnet D.C., of the type commonly used in consumer electric products and home appliances. Nonetheless, the principles of this invention are also applicable to other types of electric motors.

Figure 2:
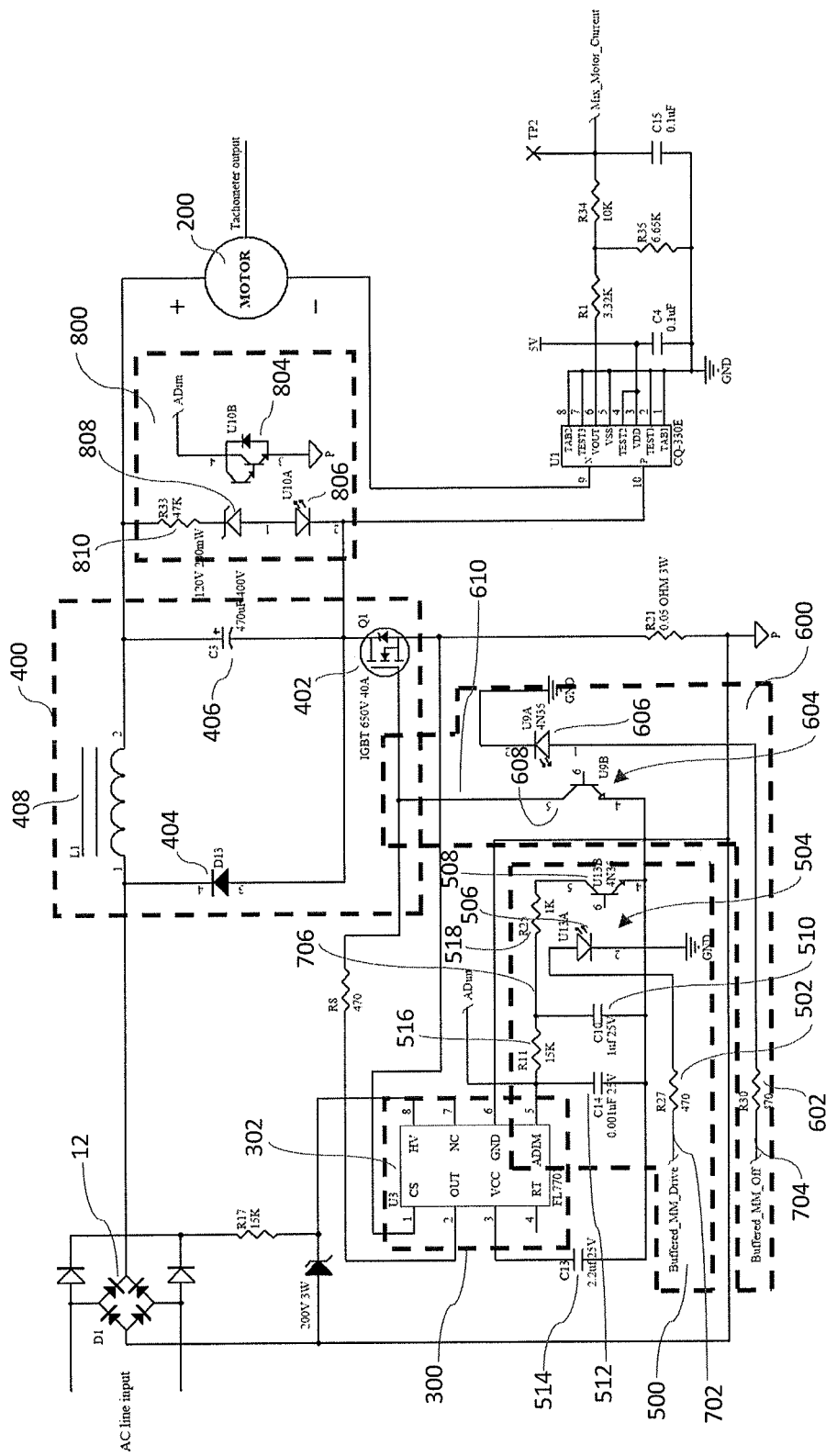
FIG. 2 is a schematic circuit diagram of a preferred embodiment of the present invention.

Turning now to FIG. 2, the PFC circuit 300 may correct a power factor by switching rectified power obtained from alternating current (AC) power through a bridge diode 12. The PFC circuit 300 of the present invention preferably includes a PFC chip 302, such as the FL7701 chip manufactured and sold by On Semiconductor (Linear Technologies). The preferred FL7701 chip has eight pins, labeled CS, OUT, VCC, RT, HV, NC, GND and ADIM. System reference voltage from the bridge diode 12 is provided to the PFC chip 302 through the HV pin. Once the PFC chip 302 has performed its power factor correction function, a transistor control current leaves the PFC chip 302 though its OUT pin and controls the power transistor 402. The primary flow of current is through the bridge rectifier 12 and the inductor 408 before reaching the motor 200. The power transistor 402 is the final piece in the current flow path back to the low side of the main power supply (the AC line input depicted to the left of the bridge rectifier 12).

The power transistor 402 in step down conversion circuit 400 is the primary control element responsible for controlling current flow from its input (supply) to its output (load). In the preferred embodiment, the step down conversion circuit 400 preferably includes a power transistor 402 (which is preferably an insulated-gate bipolar transistor (IGBT)), a diode 404, a capacitor 406 and an SMC compliant inductor 408. The power transistor 402 is a three-terminal power semiconductor device used as an electronic switch. Since it is designed to turn on and off rapidly, the power transistor 402 can synthesize complex waveforms with pulse width modulation (PWM).

PWM is a method of reducing the average power delivered by an electrical signal by effectively chopping it up into discrete parts. The average value of voltage (and current) fed to the load is controlled by turning the switch on and off at a fast rate between supply and load. The longer the switch is on compared to the off periods, the higher the total power supplied to the load. PWM is particularly suited for running inertial loads such as electric motors, which are not easily affected by discrete switching because they have the inertia to react slowly. Nonetheless, the PWM switching frequency needs to be high enough not to affect the load, which is to say that the resultant waveform perceived by the load must be as smooth as possible.

PWM digital-to-analog circuit 500 is one of the preferred ways the present invention varies the current load applied to the motor 200 so that it is optimized for different motor speeds and torque. The PWM digital-to-analog circuit 500 is particularly useful when the motor 200 needs to be operated at a low-speed, low-torque level where the voltage and/or current supplied to the motor 200 by the PFC chip 302, even at its minimum level, is too high. To operate the PWM digital-to-analog circuit, signals 202, 204 are received from the motor 200 by the microprocessor 700 indicative of the operating speed 202 of the motor 200 and current 204 being supplied to the motor (FIG. 1). Based upon these signals 202, 204, the microprocessor 700 determines whether the current needs to be adjusted to achieve optimum motor performance. If adjustment is needed, the microprocessor 700 can send a buffered control signal 702 to the PWM digital-to-analog control circuit 500 to adjust the output of the PFC chip 302.

The buffered control signal 702 passes through resistor 502 until it reaches optocoupler 504 which, in the preferred embodiment, is a combination of LED-photodiode 506 and phototransistor 508. The optocoupler 504 transfers the buffered control signal 702 using light. Voltage to reconstitute the buffered control signal 702 is provided by the VCC pin of PFC chip 302 and passes through capacitors 510, 512 and 514. The reconstituted control signal 706 passes through resistors 516, 518 until it reaches the ADIM input pin of PFC chip 302. If the microprocessor 700 determines that the current being supplied to the motor 200 is too high, the reconstituted control signal 706 will direct the PFC chip 302 to intermittently turn off current to the motor 200 using pulse width modulation. Conversely, if the microprocessor 700 determines that the current supplied to the motor 200 is too low, the reconstituted control signal 706 can direct the PFC chip 302 to increase the current provided to the motor 200.

A second preferred way in the present invention to vary current load applied to the motor 200 so that it is optimized for different motor speeds and torque is through the use of PWM digital control circuit 600. If the microprocessor 700 determines that current needs to be adjusted to achieve optimum motor performance, particularly if the motor frequency is determined to be too high, the microprocessor 700 can send a buffered control signal 704 to PWM digital control circuit 600. The buffered control signal 704 passes through resistor 602 until it reaches optocoupler 604 which, in the preferred embodiment, is a combination of LED-photodiode 606 and phototransistor 608. Again, the optocoupler 610 uses light to transfer the buffered control signal 704 and protect control circuitry from high voltages. Voltage to reconstitute the buffered control signal 704 is provided by VCC pin of PFC chip 302 and passes through capacitor 514. The reconstituted control signal 604 is then fed to the power transistor 402 of step down conversion circuit 400. When activated, the PWM digital control circuit 600 can intercept and override the output signal from the PFC chip 302 at the step down conversion circuit 400 and, in the process, intermittently turn off the power transistor 402 if the motor frequency is too high. The PWM digital control circuit 600 is particularly useful when the output load from the PFC chip 302 is set at its minimum level but the power supplied to the motor 200 is still too high. By adjusting the duty cycle, this PWM digital control circuit 600 can make the output power very low or turn it off completely.

Output voltage limiter circuit 800 provides a third way of optimizing motor performance. The output voltage limiter circuit 800 allows current to the motor 200 to be turned off if voltage across the motor 200 is higher than a predetermined level, such as 120V. The output voltage limiter circuit 800 preferably includes diode 806, Zener diode 808, resistor 810 and optocoupler 804.

A Zener diode is a diode that normally allows current to flow in the conventional manner from its anode to its cathode. Nonetheless, when the voltage across the Zener diode reaches a predetermined level, referred to as the "Zener voltage," the junction will break down and current will flow in the reverse direction.

For the output limiter circuit 800 of the present invention, current normally flows from bridge diode 12 through SMC compliant inductor 408 and into motor 200. The Zener diode 808 normally blocks current from flowing through the output voltage limiter circuit 800. Nonetheless, when the voltage reaches a predetermined threshold level, such as 120V, the Zener diode junction will break down so that current flows through the Zener diode 808 of the output limiter circuit 800. The predetermined threshold voltage for the Zener diode 808 is preferably set at a level where the current and voltage impairs operation of the motor 200. When that predetermined threshold level is reached, current flows through resistor 810, Zener diode 808 and diode 806. In this mode of operation, Zener diode 808 works with optocoupler 804 to send a signal to the ADIM pin of PFC chip 302 to temporarily turn off current to the motor 200 until the voltage across the Zener diode 808 has dropped below the predetermined threshold level. In this way, the output limiter circuit 800 protects the motor 200 from potentially damaging high levels of voltage and current.

In the foregoing specification, the invention has been described with reference to specific preferred embodiments and methods. It will, however, be evident to those of skill in the art that various modifications and changes may be made without departing from the broader scope of the invention as set forth in the appended claims. The specification and drawings are, accordingly, to be regarded in an illustrative, rather than restrictive sense; the invention being limited only by the appended claims.

What is claimed is:

1. A control circuit for optimizing the operation of an electric motor comprising:
    an electric motor;
    a power factor correction circuit: and,
    a step down conversion circuit, wherein current to said electric motor passes through said power factor correction circuit and said step down conversion circuit before reaching said motor;
    further comprising a microprocessor which receives signals indicative of the current supplied to said motor and, based upon said signals, said microprocessor can reduce the current supplied to said motor using a pulse width modulation (PWM) digital-to-analog control circuit.

2. The control circuit of claim 1 wherein said power factor correction circuit is a power factor correction chip.

3. The control circuit of claim 1 wherein said PWM digital-to-analog control circuit reduces current to said motor through signals it provides to said power factor correction circuit.

4. The control circuit of claim 3 wherein said PWM digital-to-analog control circuit reduces current to said motor by directing said power factor correction circuit to intermittently turn off power to said motor through pulse width modification.

5. The control circuit of claim 1 wherein said PWM digital-to-analog control circuit includes an optocoupler.

6. The control circuit of claim 1 wherein said step down power conversion circuit includes an insulated-gate bipolar transistor (IGBT).

7. A control circuit for optimizing the operation of an electric motor comprising:
    an electric motor;
    a power factor correction circuit: and,
    a step down conversion circuit, wherein current to said electric motor passes through said power factor correction circuit and said step down converter circuit before reaching said motor;
    further comprising a microprocessor which receives signals indicative of the current supplied to said motor and, based upon said signals, said microprocessor can reduce the current supplied to said motor using a pulse width modulation (PWM) digital control circuit.

8. The control circuit of claim 7 wherein said PWM digital control circuit reduces current to said motor through signals it provides to said step down conversion circuit.

9. The control circuit of claim 8 wherein said PWM digital control circuit reduces current to said motor by directing said step down conversion circuit to intermittently turn off power to said motor through pulse width modification.

10. The control circuit of claim 7 wherein said step down power conversion circuit includes an insulated-gate bipolar transistor (IGBT).

11. The control circuit of claim 7 wherein said PWM digital control circuit includes an optocoupler.

12. A control circuit for optimizing the operation of an electric motor comprising:
    an electric motor;
    a power factor correction circuit: and,
    a step down conversion circuit, wherein current to said electric motor passes through said power factor correction circuit and said step down conversion circuit before reaching said motor;
    further comprising an output voltage limiter circuit capable of detecting the voltage of current supplied to said motor and having current to said motor turned off if said voltage is above a predetermined level.

13. The control circuit of claim 12 wherein said output voltage limiter circuit includes a Zener diode.

14. The control circuit of claim 13 wherein said Zener diode will cause a signal to be sent to said power factor correction circuit to turn off current to said motor if the detected voltage of current supplied to said motor is above a predetermined level.

15. The control circuit of claim 12 wherein said output voltage limiter circuit includes an optocoupler.

16. The control circuit of claim 12 wherein said predetermined voltage level is 120V.

17. The control circuit of claim 12 wherein said output voltage limiter circuit causes current to said motor to be turned off intermittently if said voltage is above a predetermined level.

18. A method of optimizing the operation of an electric motor comprising the steps of:
    supplying current to an electric motor by first passing said current through a power factor correction circuit and a step down conversion circuit before it reaches said motor;
    transmitting signals indicative of current supplied to said motor to a microprocessor;
    using said microprocessor to determine whether the current supplied to said motor needs to be reduced;
    transmitting signals from said microprocessor to a pulse width modulation (PWM) digital-to-analog control circuit to reduce current to said electric motor if said microprocessor determines that said existing current level is too high.

19. The method of claim 18 wherein said PWM digital-to-analog control circuit reduces current to said motor through signals it provides to said power factor correction circuit.

20. The method of claim 19 where said PWM digital-to-analog control circuit reduces current to said motor by directing said power factor correction circuit to intermittently turn off power to said motor through pulse width modulation.

21. A method of optimizing the operation of an electric motor comprising the steps of:
    supplying current to an electric motor by first passing said current through a power factor correction circuit and a step down conversion circuit before it reaches said motor;
    transmitting signals indicative of current supplied to said motor to a microprocessor;
    using said microprocessor to determine whether the current supplied to said motor needs to be reduced;
    transmitting signals from said microprocessor to a pulse width modulation (PWM) digital control circuit to reduce current to said electric motor if said microprocessor determines that said existing current level is too high.

22. The control circuit of claim 21 wherein said PWM digital control circuit reduces current to said motor through signals it provides to said step down conversion circuit.

23. The control circuit of claim 22 wherein said PWM digital control circuit reduces current to said motor by directing said step down conversion circuit to intermittently turn off power to said motor through pulse width modulation.

24. The control circuit of claim 21 wherein said step down power conversion circuit includes an insulated-gate bipolar transistor (IGBT).

25. A method of optimizing the operation of an electric motor comprising the steps of:
supplying current to an electric motor by first passing said current through a power factor correction circuit and a step down conversion circuit before it reaches said motor;
using an output voltage limiter circuit to detect the voltage of current supplied to said motor; and,
using said output voltage limiter circuit turn off current to said motor if said voltage is determined to be above a predetermined level.

26. The method of claim 25 wherein said output voltage limiter circuit includes a Zener diode.

27. The method of claim 26 wherein said Zener diode will cause a signal to be sent to said power factor correction circuit to turn off current to said motor if the detected voltage of current supplied to said motor is above a predetermined level.

28. The method of claim 27 wherein said predetermined voltage level is 120V.

* * * * *